(12) United States Patent
Rearick

(10) Patent No.: US 10,374,422 B2
(45) Date of Patent: Aug. 6, 2019

(54) SYSTEMS AND METHODS FOR BOOST CIRCUIT COMPENSATOR MODULES

(71) Applicant: ABB Schweiz AG, Baden (CH)

(72) Inventor: Donald Rearick, Rowlett, TX (US)

(73) Assignee: ABB Schweiz AG, Baden (CH)

( * ) Notice: Subject to any disclaimer, the term of this patent is extended or adjusted under 35 U.S.C. 154(b) by 110 days.

(21) Appl. No.: 15/782,454

(22) Filed: Oct. 12, 2017

(65) Prior Publication Data

US 2018/0275700 A1 Sep. 27, 2018

Related U.S. Application Data

(60) Provisional application No. 62/476,346, filed on Mar. 24, 2017.

(51) Int. Cl.
| | |
|---|---|
| G05F 1/24 | (2006.01) |
| H02J 1/02 | (2006.01) |
| H02M 3/335 | (2006.01) |
| G05F 5/00 | (2006.01) |
| H05K 5/02 | (2006.01) |

(52) U.S. Cl.
CPC .............. *H02J 1/02* (2013.01); *G05F 1/24* (2013.01); *G05F 5/00* (2013.01); *H02M 3/33507* (2013.01); *H05K 5/0213* (2013.01)

(58) Field of Classification Search
CPC .... H02J 1/02; G05F 1/24; G05F 5/00; H02M 3/33507; H05K 5/0213
See application file for complete search history.

(56) References Cited

U.S. PATENT DOCUMENTS

| | | |
|---|---|---|
| 3,828,281 A | 8/1974 | Chambers, Jr. |
| 5,883,503 A | 3/1999 | Lace |
| 6,172,488 B1 | 1/2001 | Mizutani et al. |
| 6,693,806 B2 | 2/2004 | Uchida |
| 9,515,544 B2 | 12/2016 | Lin et al. |
| 9,548,671 B2 | 1/2017 | Ramirez |
| 9,691,312 B2 | 6/2017 | Wang et al. |
| 9,691,535 B2 | 6/2017 | Takano |
| 2015/0015078 A1 | 1/2015 | Kim |

*Primary Examiner* — Robert L Deberadinis
(74) *Attorney, Agent, or Firm* — Barnes & Thornburg LLP

(57) ABSTRACT

A boost circuit compensator module enclosure is provided. The boost circuit compensator module enclosure includes an outer housing and a connection assembly. The outer housing includes a first end and a second end, the first end spaced apart from the second end along a first direction, wherein the second end defines a plane oriented at an angle relative to the first direction, and wherein the outer housing is configured to receive a plurality of boost circuit compensator modules. The connection assembly is coupled to the outer housing proximate the second end and includes at least one row. The at least one row includes a plurality of terminal bases, each terminal base electrically coupleable between a respective boost circuit compensator module and a plurality of transmission lines. Each terminal base includes two conductor receptacles and a longitudinal axis oriented obliquely relative to the plane defined by the second end.

20 Claims, 6 Drawing Sheets

SYSTEMS AND METHODS FOR BOOST CIRCUIT COMPENSATOR MODULES

CROSS REFERENCE TO RELATED APPLICATIONS

This application is a non-provisional application and claims priority to U.S. Provisional Patent Application Ser. No. 62/476,346 filed Mar. 24, 2017 for "SYSTEMS AND METHODS FOR LINE VOLTAGE DROP COMPENSATION", which is hereby incorporated by reference in its entirety.

BACKGROUND

The embodiments described herein relate generally to a boost circuit compensator module enclosure for a line voltage drop compensation system, and, more specifically, to a boost circuit compensator module enclosure having features for improved conductor coupling and improved cooling air flow.

Electrical power is transported using several methods in commercial and industrial systems. One of these methods includes using a conductive wire, referred to as a "line", to transfer power between a power supply and a load. A voltage drop is associated with transferring power through the line, and the transmission distance can be relatively large, resulting in a substantial drop in the voltage that is received at the load. That is, the line has a resistance sufficient to cause a noticeable voltage drop between the power supply and the load. The load may be a component, such as a radio, that requires a specific voltage to function and that will be damaged or become inoperable if power having the correct voltage is not provided.

At least some known power delivery systems incorporate boost circuit systems that compensate for a voltage drop resulting from transferring power between a power supply and a load through a transmission line. However, such systems may require the use of a number of boost circuit compensator modules, with each module connected to multiple transmission lines. Housing the boost circuit compensator modules, and the numerous corresponding transmission lines, may require a significant "footprint" area to prevent each transmission line from contacting neighboring transmission lines. Additionally, the boost circuit compensator modules may require a flow of cooling air during operation to prevent overheating of the boost circuit compensator modules. Accordingly, an effective and efficient method for housing and cooling boost circuit compensator modules is needed.

BRIEF DESCRIPTION

In one aspect, a boost circuit compensator module enclosure is provided. The boost circuit compensator module enclosure includes an outer housing and a connection assembly. The outer housing includes a first end and a second end, the first end spaced apart from the second end along a first direction, wherein the second end defines a plane oriented at an angle relative to the first direction and wherein the outer housing is configured to receive a plurality of boost circuit compensator modules. The connection assembly is coupled to the outer housing proximate the second end and includes at least one row. The at least one row includes a plurality of terminal bases, each terminal base of the plurality of terminal bases electrically coupleable between a respective boost circuit compensator module of the plurality of boost circuit compensator modules and a plurality of transmission lines. Each terminal base includes two conductor receptacles and a longitudinal axis oriented obliquely relative to the plane defined by the second end.

In another aspect, a line voltage drop compensation system is provided. The line voltage drop compensation system includes a boost circuit compensator. The boost circuit compensator includes a plurality of boost circuit compensator modules and a boost circuit compensator module enclosure. The boost circuit compensator module enclosure includes an outer housing and a connection assembly. The outer housing includes a first end and a second end, the first end spaced apart from the second end along a first direction, wherein the second end defines a plane oriented at an angle relative to the first direction, and wherein the plurality of boost circuit compensator modules are positioned within the outer housing. The connection assembly is coupled to the outer housing proximate the second end and includes at least one row. The at least one row includes a plurality of terminal bases, each terminal base of the plurality of terminal bases electrically coupled between a respective boost circuit compensator module of the plurality of boost circuit compensator modules and a plurality of transmission lines. Each terminal base includes two conductor receptacles and a longitudinal axis oriented obliquely relative to the plane defined by the second end.

In yet another aspect, a method of assembling a compensator module enclosure for a line voltage drop compensation system is provided. The method includes providing an outer housing, the housing including a first end and a second end, the first end spaced apart from the second end along a first direction, wherein the second end defines a plane oriented at an angle relative to the first direction, and wherein the outer housing is configured to receive a plurality of boost circuit compensator modules. The method also includes coupling a connection assembly to the outer housing proximate the second end. The connection assembly includes at least one row including a plurality of terminal bases, wherein each terminal base of the plurality of terminal bases is electrically coupleable between a respective boost circuit compensator module of the plurality of boost circuit compensator modules and a plurality of transmission lines, wherein each terminal base includes two conductor receptacles, and wherein each terminal base has a longitudinal axis oriented obliquely relative to the plane.

DETAILED DESCRIPTION

Figure 1:
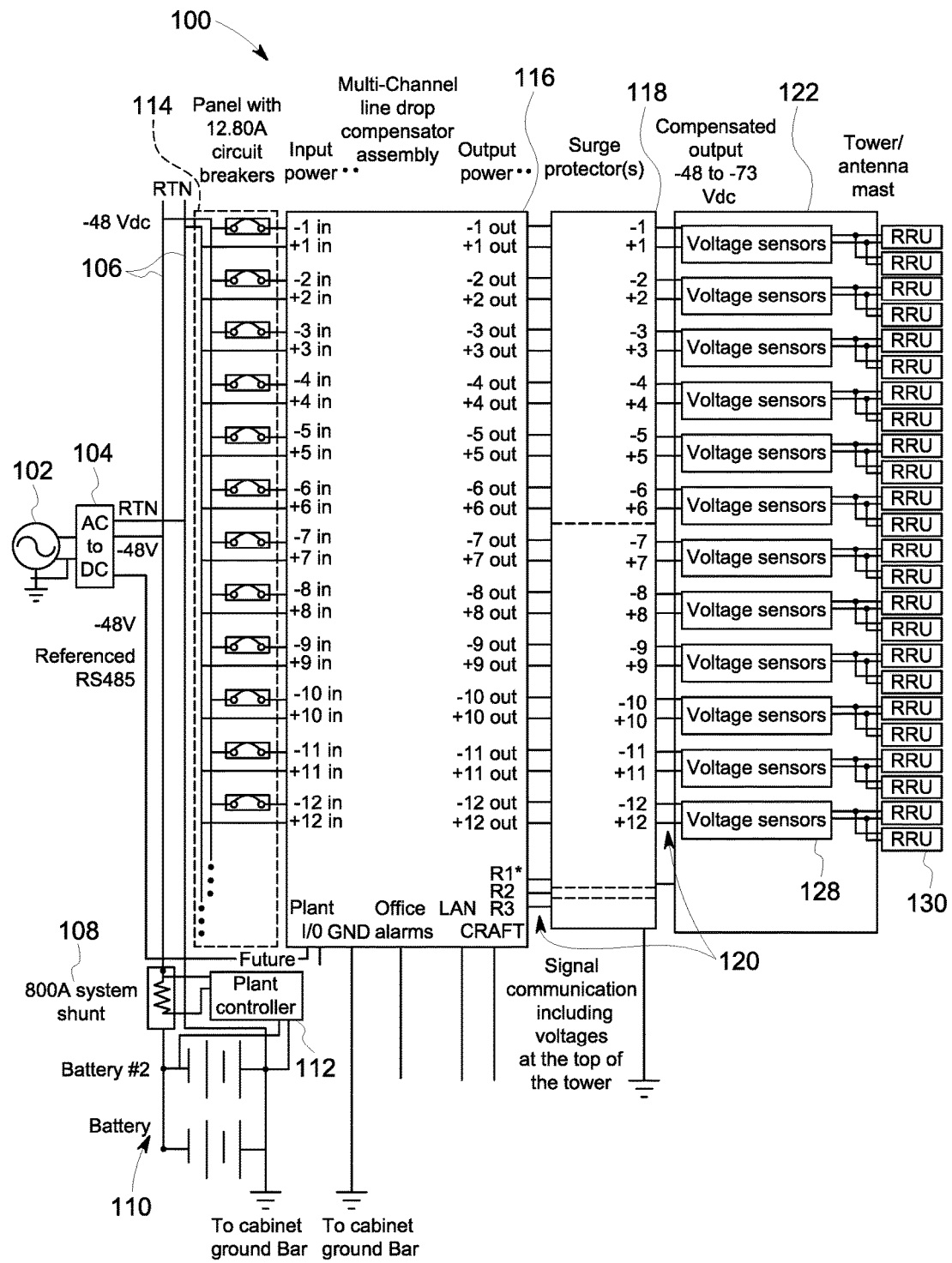
FIG. 1 is a schematic diagram of an exemplary radio system.

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. A value modified by the term "substantially similar", as used herein throughout the specification and claims, may be applied to modify any quantitative representation within a range of five percent of the referenced quantitative representation, and more particularly, within a range of one percent of the referenced quantitative representation. A value modified by the term "substantially orthogonal", as used herein throughout the specification and claims, may be applied to modify any quantitative angular relationship representation within a range of five degrees from orthogonal, and more particularly, within a range of one degree from orthogonal. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The embodiments described herein facilitate improving the reliability and ease of maintenance of a boost circuit system configured to compensate for line voltage drop between a power supply and a load using a boost circuit compensator module enclosure. Specifically, the boost circuit compensator module enclosure includes an outer housing and a connection assembly coupled to the outer housing. The outer housing includes a first end and a second end, the first end spaced apart from the second end along a first direction. The second end defines a plane oriented at an angle relative to the first direction and is configured to receive a plurality of boost circuit compensator modules. The connection assembly is coupled to the outer housing proximate the second end and includes at least one row including a plurality of terminal bases. Each terminal base is electrically coupleable between a respective boost circuit compensator module of the plurality of boost circuit compensator modules and a plurality of transmission lines. Each terminal base includes two conductor receptacle and a longitudinal axis orientated obliquely relative to the plane. A plurality of ventilation openings are defined between adjacent terminal bases. Such a configuration of the boost circuit compensator module enclosure facilitates installation, removal, maintenance, and cooling of boost circuit compensator modules, facilitating reducing operational downtime, increasing boost circuit system reliability, promoting superior performance, reducing operational costs, and improving efficiency of maintenance of the boost circuit system.

FIG. 1 is a schematic diagram of an exemplary radio system 100. Radio system 100 is used with a communication tower (not shown) to transmit and/or receive communication signals. In the example embodiment, radio system 100 is coupled to a utility source 102 (sometimes referred to as a "power supply") to receive power. More specifically, power from utility source 102 is converted from alternating current (AC) power to direct current (DC) power by converter 104 for use by system 100. In the example embodiment, system 100 includes a set of power supply lines 106, a shunt 108, a set of batteries 110, a plant or system controller 112, a plurality of circuit breakers 114, a voltage compensation system 116, a surge protector 118, a plurality of transmission lines 120, and a tower or antenna mast assembly 122. In other embodiments, system 100 includes additional, fewer, or alternative components, including those described elsewhere herein.

Power supply lines 106 provide power from utility source 102 to various components of system 100. In the example embodiment, power supply lines 106 are coupled to converter 104, shunt 108, batteries 110, controller 112, and circuit breakers 114 to provide DC power. In other embodiments, power supply lines 106 may be configured to transmit AC power. In such embodiments, power supply lines 106 may be directly connected to utility source 102. In the exemplary embodiment, power supply line 106 includes a grounded power supply line and a 48 volt (V) DC power supply line.

Shunt 108 is coupled between power supply lines 106 and batteries 110 to facilitate monitoring of an electric current by controller 112. That is, controller 112 is coupled to the two terminals of shunt 108 to monitor a voltage drop across shunt 108. The resistance value of shunt 108 is known by controller 112, and therefore controller 112 calculates the current value based on the known resistance of shunt 108 and the measured voltage drop. In at least some embodiments, shunt 108 is configured to have a relatively small resistance such that the voltage drop across shunt 108 does not substantively affect the amount of power provided to batteries 110 or circuit breakers 114. Controller 112 is configured to operate components of system 100 as described herein based on the monitored current across shunt 108.

Batteries 110 are configured to store electrical energy to supplement power provided by utility source 102 and to power other components that do not receive power from power supply lines 106. In the example embodiment, system 100 includes two batteries 110. In other embodiments, system 100 includes a different number of batteries 110 (including one or zero). Additionally or alternatively, system 100 may include other power storage devices other than batteries 110 to provide power, such as capacitors.

Controller 112 is configured to monitor parameters of system 100 and operate system 100 based on the monitored parameters. For example, controller 112 monitors the current of power supply lines 106 via shunt 108 and controls converter 104 and/or voltage compensation system 116 to adjust their output to facilitate operation of system 100.

Circuit breakers 114 are coupled between power supply lines 106 and voltage compensation system 116. Circuit breakers 114 are configured to electrically disconnect the power supply lines 106 from voltage compensation system 116 and transmission lines 120 when an over-current condition (e.g., a short circuit) is detected to protect system 100 from potential damage.

Voltage compensation system 116 is a boost circuit system configured to compensate for a voltage drop across transmission lines 120. That is, voltage compensation system 116 is configured to boost the voltage of the power supplied to tower mast assembly 122 to account for the voltage drop across transmission lines 120. In the exemplary embodiment, voltage compensation system 116 includes twelve channels for tower mast assembly 122. Each channel has a corresponding transmission line 130 and subassembly of tower mast assembly 122. As a result, each channel may have a unique line resistance and/or a unique current draw from assembly 122, thereby resulting in different voltage drops for each channel. Voltage compensation system 116 is configured to boost each channel separately to increase accuracy of the compensation for each channel. In at least some embodiments, voltage compensation system 116 may include a plurality of modules (not shown in FIG. 1) that are associated with a subset of the channels. In other embodiments, voltage compensation system 116 may include a different number of channels (including one).

Voltage compensation system 116 is coupled to transmission lines 120 to provide power to tower mast assembly 122. In the exemplary embodiment, surge protector 118 is coupled to transmission lines 120 between voltage compensation system 116 and assembly 122. Surge protector 118 is configured to limit voltage spikes on transmission lines 120 to protect assembly 122 from potential damage. In some embodiments, converter 104, power supply lines 106, shunt 108, batteries 110, controller 112, circuit breakers 114, voltage compensation system 116, and/or surge protector 118 are located at a base of the tower. In one example, shunt 108, batteries 110, circuit breaker 114, voltage compensation system 116, and surge protector 118 are positioned within a cabinet or other enclosure that is accessible by an operator for maintenance. In other embodiments, converter 104, power supply lines 106, shunt 108, batteries 110, controller 112, circuit breakers 114, voltage compensation system 116, and/or surge protector 118 may be at a different location relative to the communication tower. Transmission lines 120 extend from voltage compensation system 116 near the base of the tower to tower mast assembly 122, which is location at or near the top of the tower. Transmission lines 120 have a gauge and a length that creates a substantive resistance, thereby generating a substantive voltage drop proportional to the current drawn by the assembly 122.

In the exemplary embodiment, tower mast assembly 122 includes a plurality of voltage sensors 128 and a plurality of remote radio units (RRU) 130. RRUs 130 may sometimes be referred to herein as "radios 130" or "radio heads 130". Voltage sensors 128 are configured to monitor the voltage at or near RRUs 130. Voltage sensors 128 transmit the monitored voltage data to controller 112 and/or voltage compensation system 116 via wired or wireless communication to facilitate voltage compensation as described herein. In the exemplary embodiment, transmission lines 120 include one or more lines configured for data communication to transmit the monitored voltage data to voltage compensation system 116. In one example, the monitored voltage data is transmitted to the "R1" channel of voltage compensation system 116.

RRUs 130 are configured to receive and transmit communication signals. In the exemplary embodiment, RRUs 130 include an antenna to broadcast the signals and a capacitor to prevent instantaneous shut down of RRU 130. Each RRU 130 has a predetermined under-voltage (UV) threshold such that power from power supply lines 106 must be above the UV threshold to activate RRU 130.

Figure 2:
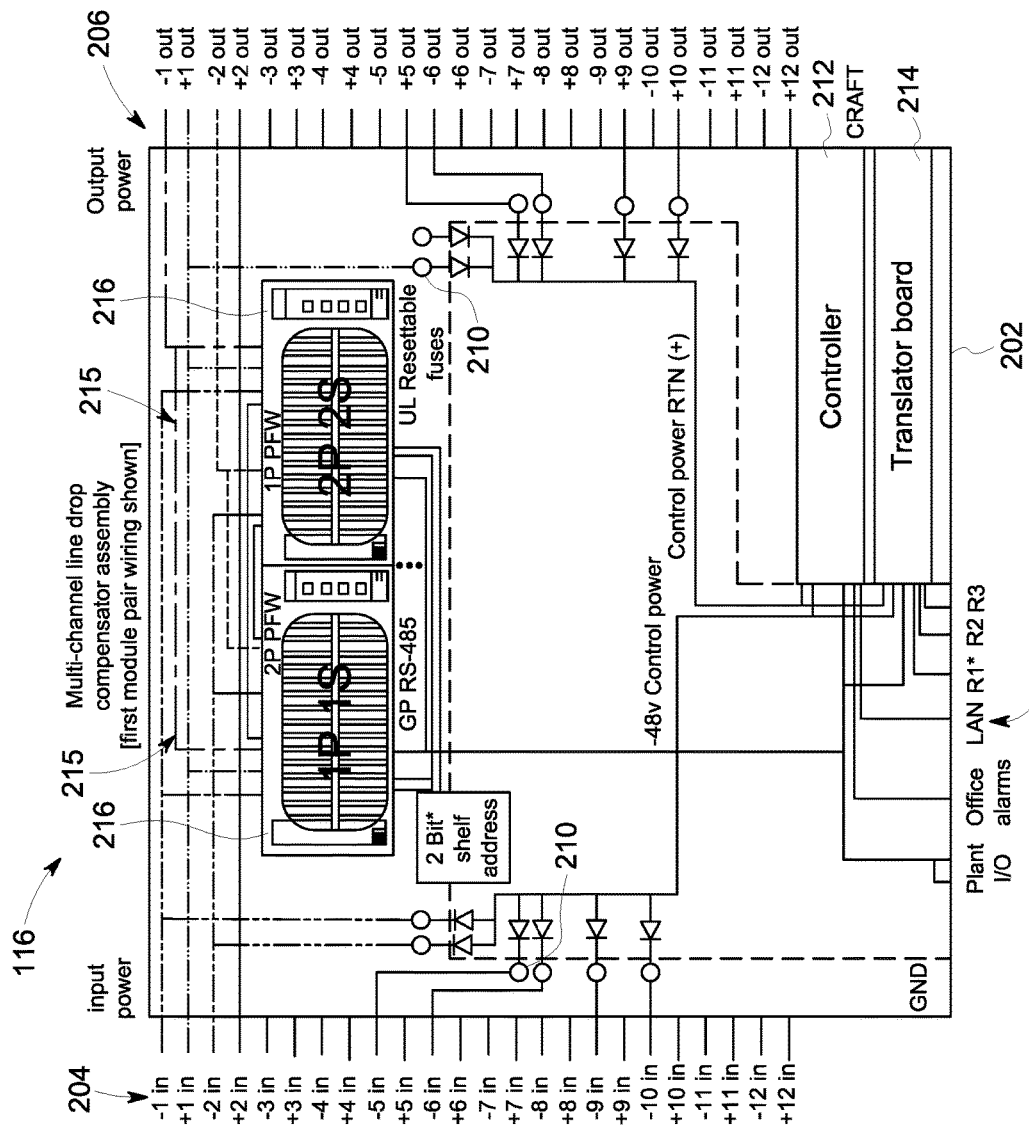
FIG. 2 is a schematic diagram of an exemplary voltage compensation system that may be used with the radio system shown in FIG. 1.

FIG. 2 is a schematic diagram of voltage compensation system 116 that may be used with radio system 100 (shown in FIG. 1). In the exemplary embodiment, voltage compensation system 116 includes a compensator module assembly 200 including a compensator module enclosure 202 having a plurality of input channels 204, a plurality of output channels 206, and a plurality of control terminals 208. Input channels 204 receive power from a power supply (e.g., utility source 102 via power supply lines 106, shown in FIG. 1) and output channels 206 transmit power to one or more RRUs via a plurality of transmission lines. Each port of input channels 204 has a respective port of output channels 206. At least some input and output channels 204, 206 are coupled to one or more fuses 210 to prevent over-current conditions from damaging components coupled to the respective channel. Control terminals 208 are configured to receive and/or transmit data (digital or otherwise) to and from a power controller 212 and a translator board 214 of voltage compensation system 116. Power controller 212 is configured to operate voltage compensation system 116 as described herein in response to data or command signals received. In at least some embodiments, translator board 214 is coupled to a communication terminal 208 (e.g., R1) for receiving monitored voltage data from a sensor at the top of the communication tower. Translator board 214 is configured to process the data for controller 212. Controller 212 uses the voltage data from translator board 214 and data from boost circuit compensator modules 216 to adjust the operation of boost circuit compensator modules 216 and compensate for the line voltage drop as described herein. In other embodiments, voltage compensation system 116 may include additional, fewer, or alternative components, including those described elsewhere herein.

Compensator module assembly 200 further includes at least one boost circuit compensator module 216. In the exemplary embodiment, compensator module assembly 200 includes twelve boost circuit compensator modules 216, however only two boost circuit compensator modules 216 are shown for clarity. In other embodiments, compensator module assembly 200 includes a different number of boost circuit compensator modules 216. Boost circuit compensator modules 216 are coupled between one or more input channels 204 and one or more output channels 206. Boost circuit compensator modules 216 may also be coupled to control terminals 208 and/or controller 212. Each boost circuit compensator module 216 is configured to selectively boost a voltage of power provided by a respective input channel 204 and transmit the boosted voltage to a transmission line via a respective output channel 206 as part of a boost circuit 218.

In the exemplary embodiment, boost circuit compensator module 216 includes a primary boost circuit 220 and a secondary boost circuit 222. Primary boost circuit 220 is configured to operate while secondary boost circuit 222 idles, remains shut down, or otherwise operates at a reduced capacity. If primary boost circuit 220 fails, secondary boost circuit 222 is configured to carry a power load from utility source 102 to RRUs 130 while primary boost circuit 220 is repaired or replaced. Boost circuit compensator module 216 includes any circuits, microprocessors, controllers, power supplies, and the like to facilitate boosting the voltage to a specific value based on a determined resistance of a transmission line as described herein. In certain embodiments, boost circuit compensator modules 216 may be configured to generate a sinusoidal, oscillating, or other signal at output channels 206. In one example, boost circuit compensator module 216 modulates the power received from input channels 204. In other embodiments, boost circuit compensator module 216 may generate the signal using a separate power source (e.g., an internal power supply).

Figure 3:
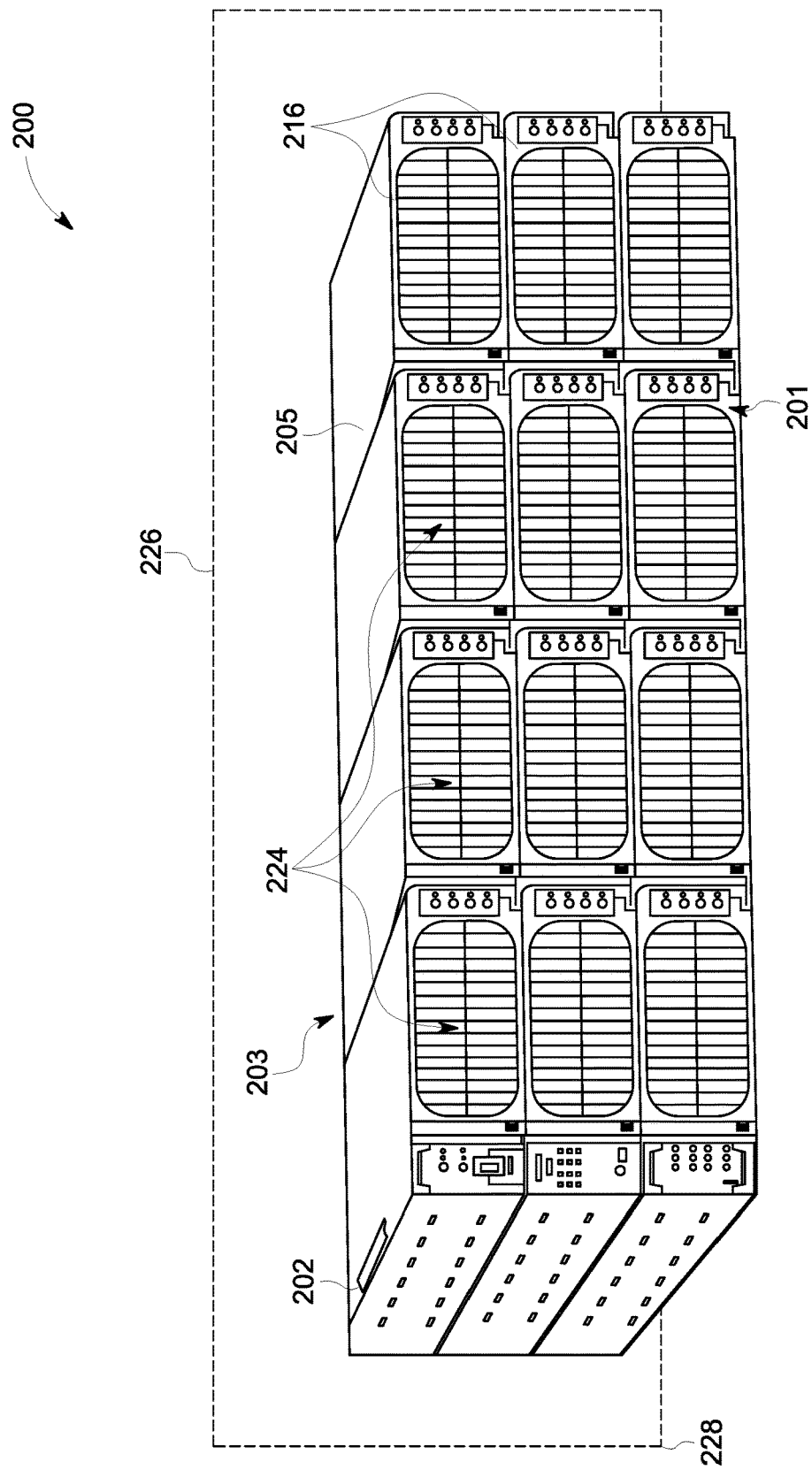
FIG. 3 is a front perspective view of an exemplary compensator module assembly that may be used with the voltage compensation system shown in FIG. 2.
Figure 4:
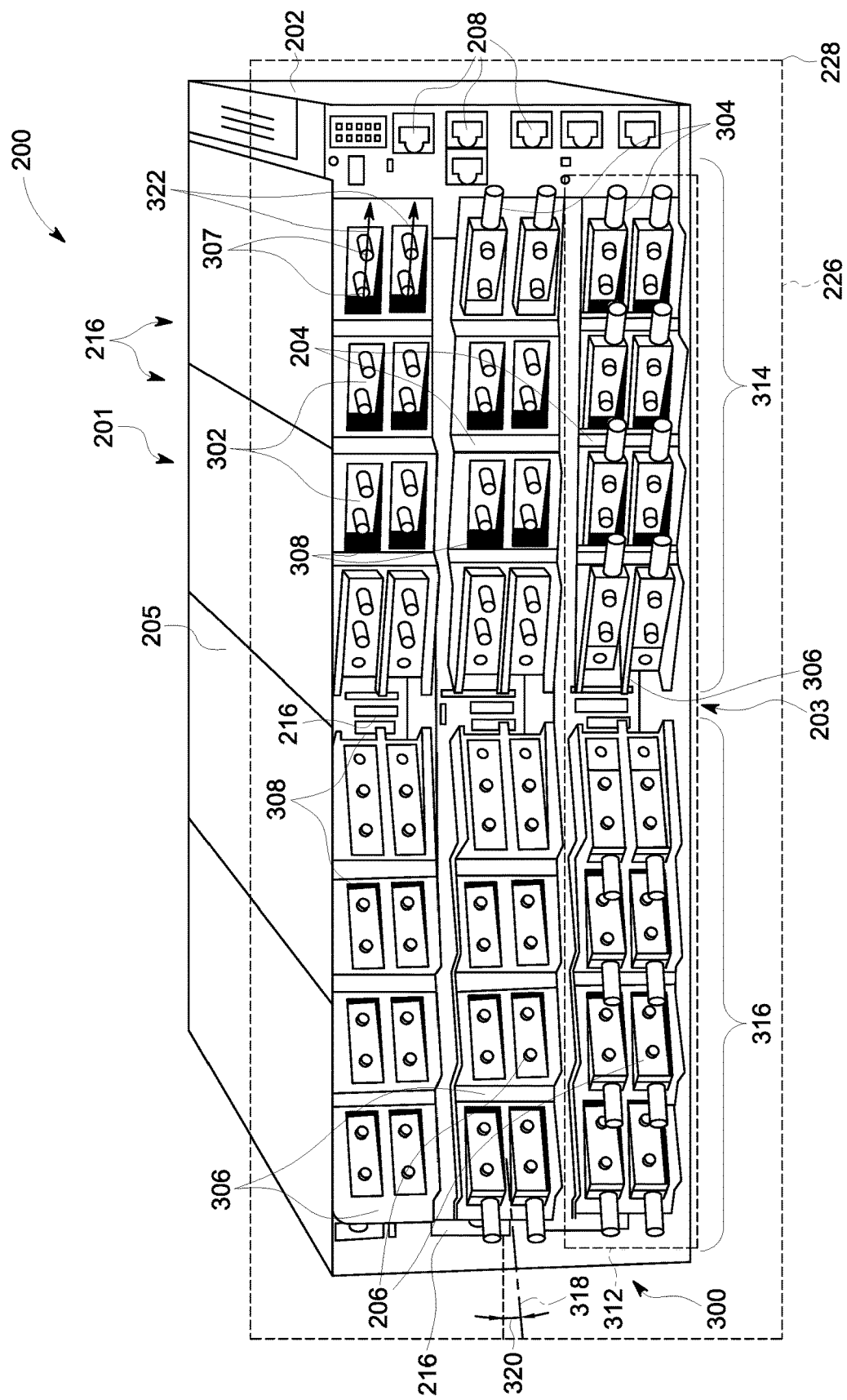
FIG. 4 is a rear perspective view of the compensator module assembly shown in FIG. 3 illustrating an exemplary connection assembly.
Figure 5:
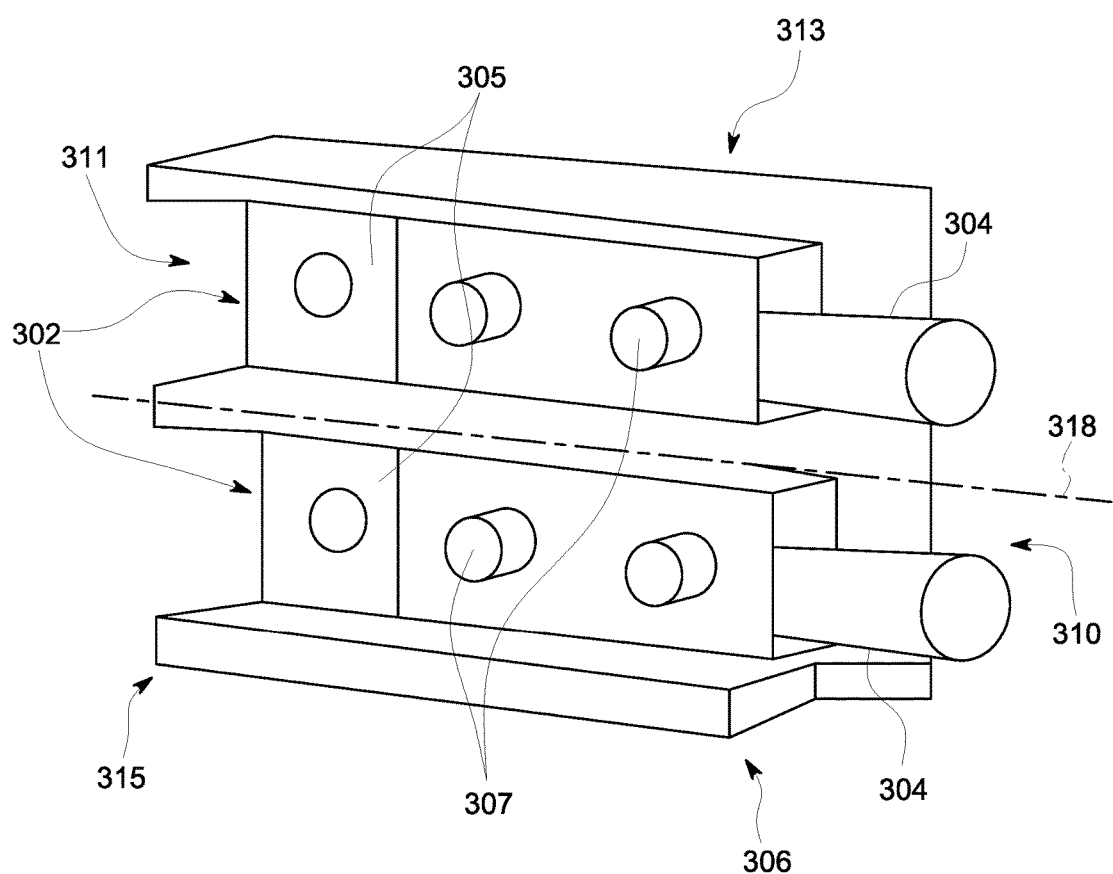
FIG. 5 is a front perspective view of an exemplary terminal base that may be used with the connection assembly shown in FIG. 4.

FIG. 3 is a front perspective view of exemplary compensator module assembly 200 that may be used with voltage compensation system 116 (shown in FIG. 2). FIG. 4 is a rear perspective view of compensator module assembly 200 (shown in FIG. 3) illustrating an exemplary connection assembly 300. FIG. 5 is a front perspective view of an exemplary terminal base 306 that may be used with connection assembly 300 (shown in FIG. 4). In the exemplary embodiment, each boost circuit compensator module 216 of compensator module assembly 200 is positioned within compensator module enclosure 202. In at least some embodiments, compensator module enclosure 202 includes a rack-mountable compensator module outer housing 205. In alternative embodiments, compensator module assembly may be configured in any manner that facilitates operation of voltage compensation system 116 as described herein.

In the exemplary embodiment, compensator module outer housing 205 includes a first end 201 and a second end 203. First end 201 is spaced apart from second end 203 along a first direction 228. Second end 203 defines a plane 226 oriented at an angle relative to first direction 228. In the exemplary embodiment, plane 226 is substantially orthogonal to first direction 228. In alternative embodiments, plane 226 may be oriented at an angle relative to first direction 228 of between five degrees and eighty-five degrees. Compensator module outer housing 205 is of sufficient volume to facilitate nesting twelve boost circuit compensator modules 216 within compensator module outer housing 205. In alternative embodiments, compensator module outer housing 205 may receive between one and twelve boost circuit compensator modules 216, or any other suitable number of boost circuit compensator modules 216. In the exemplary embodiment, boost circuit compensator modules 216 are positioned in three rows, each row including four boost circuit compensator modules 216. In other embodiments, boost circuit compensator modules 216 may be positioned in any configuration that facilitates operation of compensator module assembly 200 as is described herein.

In the exemplary embodiment, each boost circuit compensator module 216 includes an internal fan 224 to cool internal components of boost circuit compensator module 216. In alternative embodiments, boost circuit compensator module 216 may include as many internal fans 224 as facilitates operation of boost circuit compensator module 216 as described herein. Each internal fan 224 collects air from first end 201 and forces at least a portion of the collected air through boost circuit compensator module 216 to a ventilation opening 308 (shown in FIG. 4) at second end 203 of compensator module assembly 200, where the air is vented through ventilation opening 308 to the external environment.

With reference to FIGS. 4-5, connection assembly 300 is located at second end 203 of compensator module outer housing 205 and includes a plurality of terminal bases 306 configured to facilitate coupling a plurality of transmission lines 120 to a plurality of conductor receptacles 302 of terminal bases 306. In the exemplary embodiment, connection assembly 300 includes twenty-four terminal bases 306 positioned in three terminal rows 312, each terminal row 312 including eight terminal bases 306. Terminal rows 312 each include a first group 314 of input channel 204 terminal bases 306 and a second group 316 of output channel 206 terminal bases 306. Input channel 204 terminal bases 306 of first group 314 are oriented in a direction generally opposite to output channel 206 terminal bases 306 of second group 316. The orientation of input channel 204 terminal bases 306 and output channel 206 terminal bases 306 facilitates installing and removing boost circuit compensator modules 216 without disturbing surrounding transmission lines 120 that are not associated with the boost circuit compensator module 216 being installed or removed. Such an arrangement facilitates efficient maintenance and repairs of boost circuit compensator modules 216 of compensator module assembly 200. In alternative embodiments, terminal rows 312 of terminal bases 306 may be arranged and positioned in any manner that facilitates operation of compensator module assembly 200 as described herein.

In the exemplary embodiment, each terminal base 306 includes two conductor receptacles 302. Each conductor receptacle 302 includes a double-stud block 305, each double-stud block 305 including two coupler studs 307. Input channels 204 include twelve terminal bases 306 and output channels 206 include twelve terminal bases 306. To facilitate electrically coupling boost circuit compensator modules 216 to other components within system 100 (shown in FIG. 1), each double-stud block 305 is configured to receive a double-hole lug 304. Specifically, each coupler stud 307 is a solid cylinder having a first circumference and extending along a direction oriented at an angle relative to a longitudinal axis of double-stud block 305. Each hole of double-hole lug 304 has a second circumference substantially similar to the first circumference, facilitating double-hole lug 304 being received over pair of coupler studs 307. Each double-hole lug 304 is configured to be coupled to one transmission line 120 (a portion of double-hole lugs 304 are not shown for clarity only) and to one double-stud block 305 using coupler studs 307. Double-stud blocks 305 facilitate inhibiting rotation of double-hole lugs 304 by providing two points of interface between each double-hole lugs 304 and a corresponding double-stud block 305, inhibiting contact between adjacent transmission lines 120 that would result from rotation of double-hole lugs 304. In the exemplary embodiment, double-stud blocks 305, coupler suds 307, and double-hole lugs 304 are an electrically-conductive copper alloy. In an alternative embodiment, double-stud blocks 305, coupler suds 307, and double-hole lugs 304 are an electrically-conductive aluminum alloy. In yet another embodiment, double-stud blocks 305, coupler suds 307, and double-hole lugs 304 are formed from any electrically-conductive material that facilitates operation of compensator module assembly 200 as described herein.

In the exemplary embodiment, terminal bases 306 are oriented within each terminal row 312 to facilitate the egress of air from boost circuit compensator modules 216 located within compensator module outer housing 205. Specifically, a first end 310 of a first terminal base 306 is oriented proximate a second end 311 of an adjacent second terminal base 306 in terminal row 312 such that a longitudinal axis 318 of the first terminal base 306 and longitudinal axis 318 of the second terminal base are substantially parallel. Each terminal base 306 is oriented obliquely at a terminal base angle relative to plane 226 within each terminal row 312 such that each first end 310 is located further from second end 203 along first direction 228 than an adjacent second end 311, defining a plurality of ventilation openings 308 between adjacent terminal bases 306. In the exemplary embodiment, longitudinal axis 318 of each terminal base 306 is orientated obliquely at an angle 320 of between, for example, twenty-five degrees and forty-five degrees relative to plane 226. In alternative embodiments, longitudinal axis 318 may be oriented relative to plane 226 by any angle 320 that facilitates operation of compensator module assembly 200 as described herein.

In the exemplary embodiment, a plurality of ventilation path 322 are defined as extending through each compensator module 216 from first end 201 to second end 203, through each ventilation opening 308, and over conductor receptacles 302. Specifically, a volume of air is drawn into flow path 322 within each compensator module 216 by internal fan 224 and directed through compensator module 216 to an exit at ventilation opening 308. An inner side 313 of terminal base 306 facilitates directing air exiting from ventilation opening 308 towards an adjacent terminal base 306 second end 311 such that air is channeled at least partially through conductor receptacles 302 of the adjacent terminal base 306 along ventilation path 322. Airflow through conductor receptacles 302 facilitates cooling of electrical components such as double-stud blocks 305 and double-hole lugs 304, for example. Additionally, terminal bases 306 act as thermal barriers to inhibit thermal and radiative heat transfer from double-hole lugs 304 and double-stud blocks 305 to boost circuit compensator modules 216 within compensator module enclosure 202. In alternative embodiments, terminal bases 306 may be angled and positioned in any manner that facilitates operation of compensator module assembly 200 as described herein.

Figure 6:
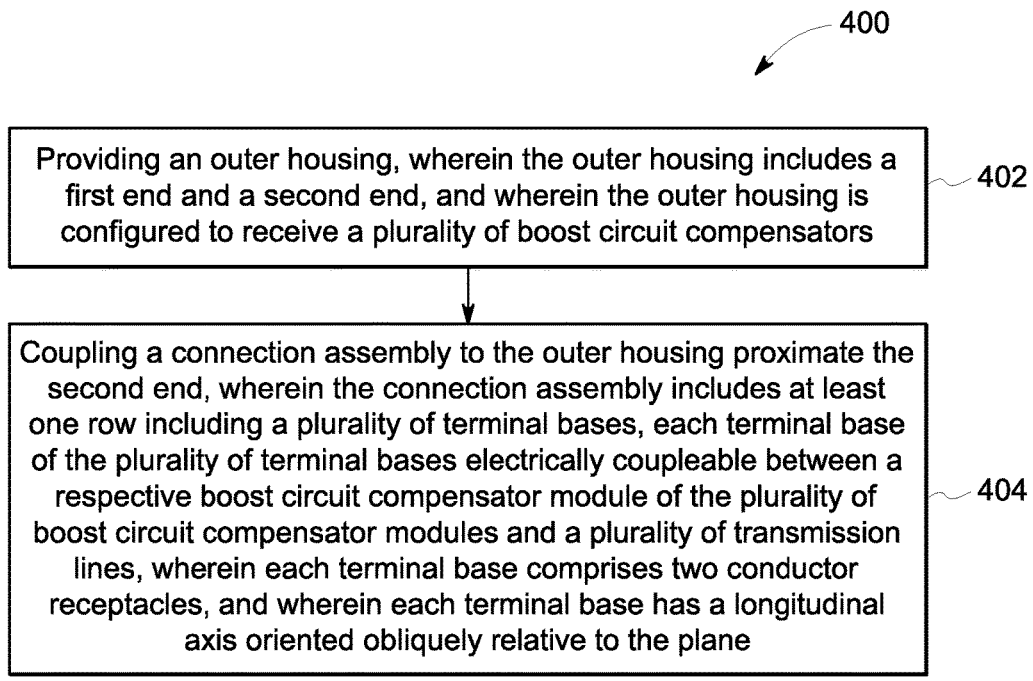
FIG. 6 is a flow chart illustrating a method for assembling a compensator module enclosure.

FIG. 6 is a flow chart illustrating a method of assembling a compensator module enclosure 202. Referring to FIGS. 1-5, method 400 includes providing 402 an compensator module outer housing 205, compensator module outer housing 205 including a first end 201 and a second end 203, first end 201 spaced apart from second end 203 along a first direction, wherein second end 203 defines a plane 226 oriented at an angle relative to first direction 228, and wherein compensator module outer housing 205 is configured to receive a plurality of boost circuit compensator modules 216. Method 400 also includes coupling 404 a connection assembly 300 to compensator module outer housing 205 proximate second end 203. Connection assembly 300 includes a plurality of terminal rows 312 including a plurality of terminal bases 306. Each terminal base 306 of the plurality of terminal bases 306 is electrically coupleable between a respective boost circuit compensator module 216 of the plurality of boost circuit compensator modules 216 and a plurality of transmission lines 120, wherein each terminal base 306 has a longitudinal axis 318 oriented obliquely relative to plane 226. In alternative embodiments, second end 203 may define plane 226 at any angle relative to first direction 228 as facilitates operation of compensator module enclosure 202 as described herein.

The above-described boost circuit systems facilitate improving the reliability, size constraints, and ease-of-maintenance of a boost circuit system configured to compensate for line voltage drop between a power supply and a load using a boost circuit compensator module enclosure. Specifically, the boost circuit compensator module enclosure includes an outer housing and a connection assembly coupled to the outer housing. The outer housing includes a first end and a second end, the first end spaced apart from the second end along a first direction. The second end defines a plane oriented at an angle relative to the first direction and is configured to receive a plurality of boost circuit compensator modules. The connection assembly is coupled to the outer housing proximate the second end and includes at least one row including a plurality of terminal bases. Each terminal base is electrically coupleable between a respective boost circuit compensator module of the plurality of boost circuit compensator modules and a plurality of transmission lines. Each terminal base includes two conductor receptacle and a longitudinal axis orientated obliquely relative to the plane. A plurality of ventilation openings are defined between adjacent terminal bases. Such a configuration of the boost circuit compensator module enclosure facilitates installation, removal, maintenance, and cooling of boost circuit compensator modules, facilitating reducing operational downtime, increasing boost circuit system reliability, promoting superior performance, reducing operational costs, and improving efficiency of maintenance of the boost circuit system.

An exemplary technical effect of the methods, systems, and apparatus described herein includes at least one of: (a) reducing operational downtime due to scheduled maintenance; (b) reducing the cost of operating a boost circuit system; (c) improving the reliability of a boost circuit system; (d) improving ease-of-maintenance of a boost circuit system; and (e) improving cooling of boost circuit compensator modules within a boost circuit system.

Exemplary embodiments of a boost circuit compensator module enclosure having features for improved conductor coupling and improved cooling air flow are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with components as described herein. Rather, one or more embodiments may be implemented and utilized in connection with other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A boost circuit compensator module enclosure comprising:
    an outer housing comprising a first end and a second end, said first end spaced apart from said second end along a first direction, wherein said second end defines a plane oriented at an angle relative to the first direction, and wherein said outer housing is configured to receive a plurality of boost circuit compensator modules; and
    a connection assembly coupled to said outer housing proximate said second end, said connection assembly comprising:
        at least one row, said at least one row comprising:
            a plurality of terminal bases, each terminal base of said plurality of terminal bases electrically coupleable between a respective boost circuit compensator module of the plurality of boost circuit compensator modules and a plurality of transmission lines, wherein each terminal base comprises two conductor receptacles, and wherein each terminal base has a longitudinal axis oriented obliquely relative to the plane defined by said second end.

2. The boost circuit compensator module enclosure in accordance with claim 1, wherein the plane defined by said second end is substantially orthogonal to the first direction.

3. The boost circuit compensator module enclosure in accordance with claim 1, wherein the longitudinal axis is oriented at a terminal base angle of between approximately ninety degrees and zero degrees relative to the plane.

4. The boost circuit compensator module enclosure in accordance with claim 3, wherein the terminal base angle is between approximately twenty-five degrees and forty-five degrees.

5. The boost circuit compensator module enclosure in accordance with claim 1, wherein each conductor receptacle comprises a double-stud block comprising two coupler studs, and wherein each double-stud block is configured to be coupled to a double-hole lug.

6. The boost circuit compensator module enclosure in accordance with claim 1, wherein said boost circuit compensator module enclosure is configured to receive twelve boost circuit compensator modules.

7. The boost circuit compensator module enclosure in accordance with claim 1, wherein said at least one row comprises a first group of input channel terminal bases and a second group of output channel terminal bases.

8. The boost circuit compensator module enclosure in accordance with claim 1, wherein a plurality of ventilation openings are defined between adjacent terminal bases, and wherein one of the plurality of ventilation openings, an inner side of a first terminal base, and said conductor receptacles of an adjacent second terminal base are configured to define a ventilation flow path between the ventilation opening, said inner side of said first terminal base, and said conductor receptacles of said adjacent second terminal base.

9. The boost circuit compensator module enclosure in accordance with claim 1, wherein said at least one row comprises three rows, and wherein each row comprises eight terminal bases.

10. A line voltage drop compensation system comprising:
    a boost circuit compensator module enclosure comprising:
        a plurality of boost circuit compensator modules; and
        a boost circuit compensator module enclosure comprising:
            an outer housing comprising a first end and a second end, said first end spaced apart from said second end along a first direction, wherein said second end defines a plane oriented at an angle relative to the first direction, and wherein said plurality of boost circuit compensator modules are positioned within said outer housing; and
            a connection assembly coupled to said outer housing proximate said second end, said connection assembly comprising:
                at least one row, said at least one row comprising:
                    a plurality of terminal bases, each terminal base of said plurality of terminal bases electrically coupled between a respective boost circuit compensator module of said plurality of boost circuit compensator modules and a plurality of transmission lines, wherein each terminal base comprises two conductor receptacles, and wherein each terminal base has a longitudinal axis oriented obliquely relative to the plane defined by said second end.

11. The line voltage drop compensation system of claim 10, wherein the plane defined by said second end is substantially orthogonal to the first direction.

12. The line voltage drop compensation system of claim 10, wherein the longitudinal axis is oriented at a terminal base angle of between approximately ninety degrees and zero degrees relative to the plane.

13. The line voltage drop compensation system of claim 12, wherein the terminal base angle is between approximately twenty-five degrees and forty-five degrees.

14. The line voltage drop compensation system of claim 10, wherein each conductor receptacle comprises a double-stud block comprising two coupler studs, and wherein each double-stud block is configured to be coupled to a double-hole lug.

15. The line voltage drop compensation system of claim 10, wherein said boost circuit compensator module enclosure is configured to receive twelve boost circuit compensator modules.

16. The line voltage drop compensation system of claim 10, wherein said at least one row comprises a first group of input channel terminal bases and a second group of output channel terminal bases.

17. The line voltage drop compensation system of claim 10, wherein a plurality of ventilation openings are defined between adjacent terminal bases, and wherein one of the plurality of ventilation openings, an inner side of a first terminal base, and said conductor receptacles of an adjacent second terminal base are configured to define a ventilation flow path between the ventilation opening, said inner side of said first terminal base, and said conductor receptacles of said adjacent second terminal base.

18. The line voltage drop compensation system of claim 10, wherein said at least one row comprises three rows, and wherein each row comprises eight terminal bases.

19. A method of assembling a compensator module enclosure for a line voltage drop compensation system, said method comprising:

- providing an outer housing, the outer housing including a first end and a second end, the first end spaced apart from the second end along a first direction, wherein the second end defines a plane oriented at an angle relative to the first direction, and wherein the outer housing is configured to receive a plurality of boost circuit compensator modules; and
- coupling a connection assembly to the outer housing proximate the second end, wherein the connection assembly includes:
    - at least one row including a plurality of terminal bases, each terminal base of the plurality of terminal bases electrically coupleable between a respective boost circuit compensator module of the plurality of boost circuit compensator modules and a plurality of transmission lines, wherein each terminal base comprises two conductor receptacles, and wherein each terminal base has a longitudinal axis oriented obliquely relative to the plane.

20. The method in accordance with claim 19, wherein providing an outer housing further comprises providing an outer housing configured to receive twelve boost circuit compensator modules.

* * * * *